United States Patent
Eliyahu et al.

(10) Patent No.: US 6,457,286 B1
(45) Date of Patent: Oct. 1, 2002

(54) DOUBLE-PANED ORNAMENTAL PANEL OR WINDOW WITH CHANGEABLE OPACITY COMPRISING A FILLABLE MARGIN, CARTRIDGES TO PROVIDE COLORED MATERIAL INTO THE MARGIN, AND A WIPER

(76) Inventors: Tuvya Eliyahu, Ein Netafim 20, Eilat 88000 (IL); Israel Mansherov, Arlozarov 60, Ramat Gan 52493 (IL)

( * ) Notice: Subject to any disclaimer, the term of this patent is extended or adjusted under 35 U.S.C. 154(b) by 0 days.

(21) Appl. No.: 09/629,480

(22) Filed: Jul. 31, 2000

(51) Int. Cl.[7] ............................................. E06B 7/00
(52) U.S. Cl. ...................... 52/171.3; 52/311.1; 40/552
(58) Field of Search ........................ 52/171.3, 311.1, 52/38; 40/552, 545

(56) References Cited

U.S. PATENT DOCUMENTS

| | | | | |
|---|---|---|---|---|
| 1,710,563 A | * | 4/1929 | Allen | 52/171 |
| 2,439,553 A | * | 4/1948 | Winn | 359/228 |
| 3,001,300 A | * | 9/1961 | Green | 434/36 |
| 5,009,044 A | * | 4/1991 | Baughman et al. | 52/171 |
| 5,589,958 A | * | 12/1996 | Lieb | 349/16 |

FOREIGN PATENT DOCUMENTS

DE         3401226 A1  * 10/1984

* cited by examiner

*Primary Examiner*—Carl D. Friedman
*Assistant Examiner*—Naoko Slack
(74) *Attorney, Agent, or Firm*—D'vorah Graeser

(57) ABSTRACT

A user controlled ornamental panel or window, which is useful for a number of applications in which the degree or amount of light passing through the panel is to be controlled. One such application is to control the amount of light, ambient or otherwise, entering through a window. The ability to control the amount of ambient light entering through a vehicle window and/or window of a dwelling is particularly useful. The present invention enables the user to control the amount of ambient light passing through the ornamental panel, such that the lighting of the environment is determined by the user without permanently blocking or altering the ability of the ornamental panel to permit the entry of light. Such flexibility is important for adjusting the amount of light entering through the panel according to the ambient lighting of the external environment, which would differ during daylight hours as opposed to the night, for example.

10 Claims, 4 Drawing Sheets

DOUBLE-PANED ORNAMENTAL PANEL OR WINDOW WITH CHANGEABLE OPACITY COMPRISING A FILLABLE MARGIN, CARTRIDGES TO PROVIDE COLORED MATERIAL INTO THE MARGIN, AND A WIPER

FIELD AND BACKGROUND OF THE INVENTION

The present invention relates to ornamental and aesthetic objects and, in particular, it concerns windows and user-controlled visual panels.

A myriad of ornamental windows have existed throughout the ages. Individuals have sought to improve lighting and light effects by using colored glass, or creating glass mosaics. Numerous examples of lavish creations can be seen in many churches around the world.

Unfortunately, a latent deficiency of existing windows is fixed color and shading. Such a deficiency is exacerbated when lighting conditions are non-favorable and even harmful. By way of example only, drivers of vehicles have addressed this problem by either tinting or darkening the windows of the vehicle or wearing sunglasses and the like.

The obvious risk of dark windows is the inability of the driver to perceive the external environment and the driving conditions during the hours of darkness.

The risk is considered to be of sufficient magnitude that several jurisdictions have seen fit to legislate against excessive darkening or tinting of vehicle windows.

A further example concerns home dwellers who may wish to prevent individuals outside the house to be able to view inside the dwelling. Furthermore, since individuals cannot control the degree of ambient light entering their home and office, artificial lighting is used excessively and inefficiently.

There is therefore a need for a window which can control degrees of lighting, and the amount of ambient light entering through the window.

There is a further need for a vehicle window, which is responsive to external light conditions and for creating optimal tinting and shading of vehicle windows.

SUMMARY OF THE INVENTION

The present invention is of a user controlled ornamental panel, which is useful for a number of applications in which the degree or amount of light passing through the panel is to be controlled. One such application is to control the amount of light, ambient or otherwise, entering through a window. The ability to control the amount of ambient light entering through a vehicle window and/or window of a dwelling is particularly useful. The present invention enables the user to control the amount of ambient light passing through the ornamental panel, such that the lighting of the environment is determined by the user without permanently blocking or altering the ability of the ornamental panel to permit the entry of light. Such flexibility is important for adjusting the amount of light entering through the panel according to the ambient lighting of the external environment, which would differ during daylight hours as opposed to the night, for example.

According to a first embodiment of the present invention, there is provided an ornamental window comprising: (a) a first panel; (b) a second panel situated at a distance from the first panel, thereby forming a readily fillable margin between the first panel and the second panel; and (c) a material for filling the readily fillable margin, the material determining an amount of light passing through the ornamental window according to an opacity of the material.

According to a second embodiment of the present invention, there is provided an ornamental window for a vehicle, the vehicle featuring a vehicle window, the ornamental window comprising: (a) a first panel, readily attachable to the vehicle window, wherein the first panel is attached at a distance from the vehicle window; (b) a readily fillable margin formed between the first panel and the vehicle window; (c) a material for filling the readily fillable margin, the material determining an amount of light passing through the ornamental window according to an opacity of the material, the material including at least one color forming material; and (d) a color module for controlling a color of the material in the margin formed between the first panel and the vehicle window, by adjusting an amount of the color forming material in the margin.

According to a third embodiment of the present invention, there is provided an ornamental system comprising a matrix of a plurality of ornamental windows, wherein each window comprises: (a) a first panel; (b) a second panel situated at a distance from the first panel, thereby forming a readily fillable margin between the first panel and the second panel; and (c) a material for filling the readily fillable margin, the material determining an amount of light passing through the ornamental window according to an opacity of the material.

According to a fourth embodiment of the present invention, there is provided an ornamental system comprising a matrix of ornamental windows, wherein each window includes: (a) a first panel; (b) a second panel situated at a distance from the first panel, thereby forming a readily fillable margin between the first panel and the second panel; (c) a color module including a plurality of cartridges, for controlling color of the content in the margin formed between the first panel and the second panel; (d) a control module for controlling the color module; (e) a power source for powering the control module and the color module; (f) a processing and control unit electronically attached to the control module, including a remote control receiver for receiving remote commands; (g) a remote control transmitter including: (i) an activator switch; (ii) a deactivator switch; and (iii) a rainbow control for controlling color of content in the margin formed between the first panel and the second panel; (h) a light sensor electronically connected to the control module, wherein the control module is responsive to light measurements of the light sensor; and (i) a plurality of valves, responsive to commands from the control module, for controlling content of each of the windows.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a user controlled ornamental panel, which is useful for a number of applications in which the degree or amount of light passing through the panel is to be controlled. One such application is to control the amount of light, ambient or otherwise, entering through a window. The ability to control the amount of ambient light entering through a vehicle window and/or window of a dwelling is particularly useful. The present invention enables the user to control the amount of ambient light passing through the ornamental panel, such that the lighting of the environment is determined by the user without permanently blocking or altering the ability of the ornamental panel to permit the entry of light. Such flexibility is important for adjusting the amount of light entering through the panel according to the ambient lighting of the external environment, which would differ during daylight hours as opposed to the night, for example.

The present invention features a number of preferred but exemplary embodiments, as described in greater detail below. According to a first preferred embodiment, the ornamental panel or window is formed from two panels, with a readily fillable margin formed between the two panels, which is filled with a material. This material controls the amount of light passing through the ornamental panel, according to the opacity of the material. The material is preferably a gas, a liquid or a combination thereof. More preferably, the material features a colored material, which can then optionally be adjusted in order to control the color of the ornamental panel or window.

According to a second preferred embodiment, the ornamental window is formed from a first panel which is attached to a vehicle window, such that the readily tillable margin is formed between the first panel and the vehicle window. This margin is then filled with a material as previously described.

According to a third preferred embodiment, a system is formed from a plurality of such ornamental panels or windows, which are then arranged in a matrix. The individual panels or windows are preferably separately adjustable, such that symbols or designs can optionally be formed from the panels or windows in the system.

The principles and operation of an ornamental panel or window, operated and controlled by a user, according to the present invention may be better understood with reference to the drawings and the accompanying description.

Figure 1:
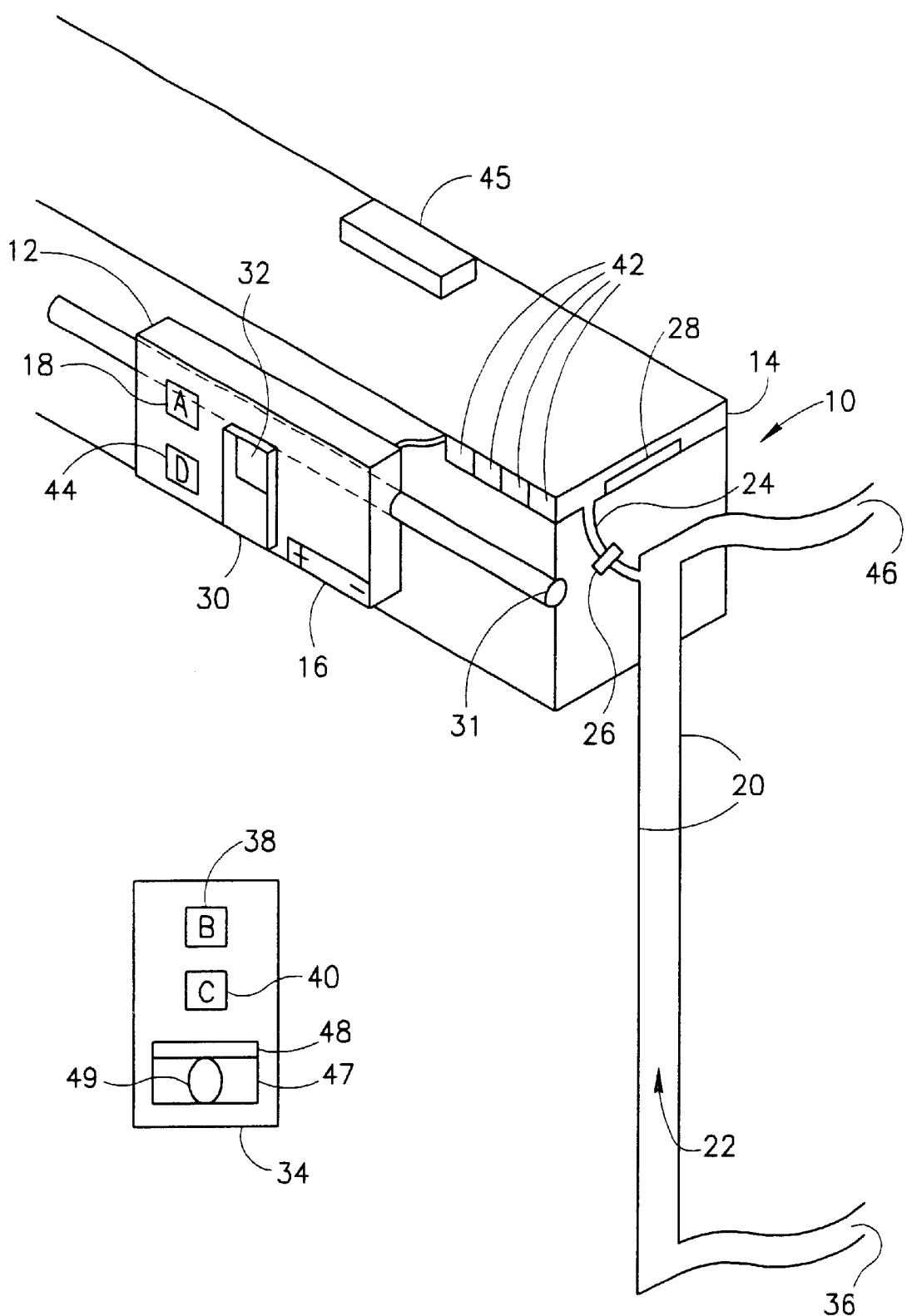
FIG. 1 is a perspective cross sectional view of an ornamental panel according to the present invention.

Referring now to the drawings, FIG. 1 shows a perspective cross sectional view of an ornamental panel according to the present invention. A window frame 10 includes a control module 12 for controlling a color module 14. Control module 14 preferably includes a power source 16 and an activator switch 18, generally designated "A". Preferably, color module 14 is responsive to activator switch 18 being depressed.

As shown, window 10 also includes at least two transparent or translucent panels 20. Alternatively, semi-transparent, frosted or tinted panels can be used. Panels 20 are situated at a distance from each other, thereby creating a margin 22, which is readily filled with gases or fluids, or a combination thereof. The material which fills margin 22 therefore determines the amount of light passing through window 10, according to the opacity of the material. Alternatively, the air may be pumped out of margin 22 to create a vacuum, such that insulation properties and acoustic properties of the present invention can be enhanced.

Preferably, a tube 24 is attached to margin 22, formed between panels 20, on one extremity of tube 24. The other extremity of tube 24 is attached to color module 14, thus readily facilitating flow of liquid or gaseous coloring agents from color module 14 to margin 22. Preferably tube 24 includes a valve 26 for controlling the direction and flow of fluids and gases between color module 14 and margin 22 formed between panels 20. An actuator 28 is preferably attached to color module 14 for readily entering color agents from color module 14 to margin 22 and for removing color agents or air from margin 22 formed between panels 20. Preferably, valve 26 is responsive to a processing and control unit 30.

Preferably, a light source 31 is electronically attached to processing and control unit 30, such that the content of margin 22 can be illuminated by light source 31. By way of example only, light source 31 is a fluorescent lamp providing overhead lighting for the content of margin 22.

Especially preferred, a remote control receiver 32 is attached to processing and control unit 30 and receiver 32 is responsive to commands from a remote control transmitter 34, such that a user can remotely operate the device of the present invention.

Preferably, a first pipe 36 is attached to the bottom of margin 22 formed between panels 20 for readily emptying, filling and replacing fluids and gases in margin 22.

Preferably, remote control transmitter 34 includes at least an activator switch 38, designated "B" and a deactivator switch 40, designated "C". Clearly, remote control transmitter 34 can be constructed to remotely control the performance of any of the above features and functions.

Preferably, a multiplicity of agent cartridges 42 are included in color module 14, such that a user can select a different color or a specific color mixture, according to the choice of the user. Alternatively, pre-designated color combinations and timed color changes can be programmed in processing and control unit 30, thereby matching the external ambient light to the lighting requirements. Thus, by way of example a vehicle window can be tinted to create optimal visibility for drivers. Additionally, color changes can be created according to the desire of the user. By way of example only, a driver can select to enter a non-transparent agent, thereby preventing onlookers from examining the vehicle contents when the vehicle is not being operated, as well as potentially preventing excessive sunlight from entering the parked vehicle during daylight hours. Likewise, a home dweller may choose to prevent onlookers from examining the contents of the home when the user is out of the house or asleep.

Preferably, control module 12 includes a manual operation key 44 designated "D" for the purpose of performing the opposite function to the function of activator switch 18.

Thus, complete manual operation of the device according to the present invention, is facilitated with and without remote control transmitter 34 and remote control receiver 32.

Preferably, agent cartridges 42 contain a toner, pigment, concentrate of color and the like. Additionally and preferably, first pipe 36 is connected to a running water system or a water reservoir, such that pigment addition and dilutions can change the degree, tone and intensity of color appearing through panels 20 as well as controlling the quantity of ambient light exiting through panels 20 and margin 22 formed between panels 20.

Alternatively, a second pipe 46 is connected to the upper part of margin 22 formed between panels 20. Especially preferred, first pipe 36 is used to empty the contents of margin 22 formed between panels 20 and second pipe 46 is connected to a running water system or a water reservoir, for filling margin 22 with water colored by cartridges 42.

Thus, the ability to replace the contents of margin 22 with water can be used for cooling purposes and increased heat dissipation, as well as the aesthetic characteristics of window 10.

For increased control on color combinations, remote control 34 preferably includes a "rainbow" control 47. Preferably, a rainbow colored panel 48 visibly indicates the visible light spectrum, such that a user can displace a control switch 49, thereby setting "rainbow" control to a specific wavelength of visible light. Preferably, processing and control unit 30 is responsive to "rainbow" control 47 settings, such that cartridges 42 create substantially the same color combination as indicated by control switch 49 and panel 48.

Four cartridges 42 are shown in FIG. 1. By way of example only, cartridges 42 preferably include a yellow cartridge 42, a blue cartridge 42, a red cartridge 42 and a black cartridge 42, thus facilitating the color combination of substantially the entire visible light spectrum.

Optionally, window 10 includes a light sensor 45 for measuring the quantity of ambient light on the external and internal sides of window 10. Preferably, processing and control unit 30 is responsive to measurements and data received from sensor 45. Thus, according to the difference between light measured internally and externally, color changes can be pre-programmed to substantially create consistent and adequate lighting on the internal side of window 10. Such a feature would be highly advantageous when window 10 is a vehicle window. Preferably, activation and de-activation of sensor 45 and color changes, responsive to sensor 45, can be user controlled from either control module 12 or remote control 34.

Figure 2:
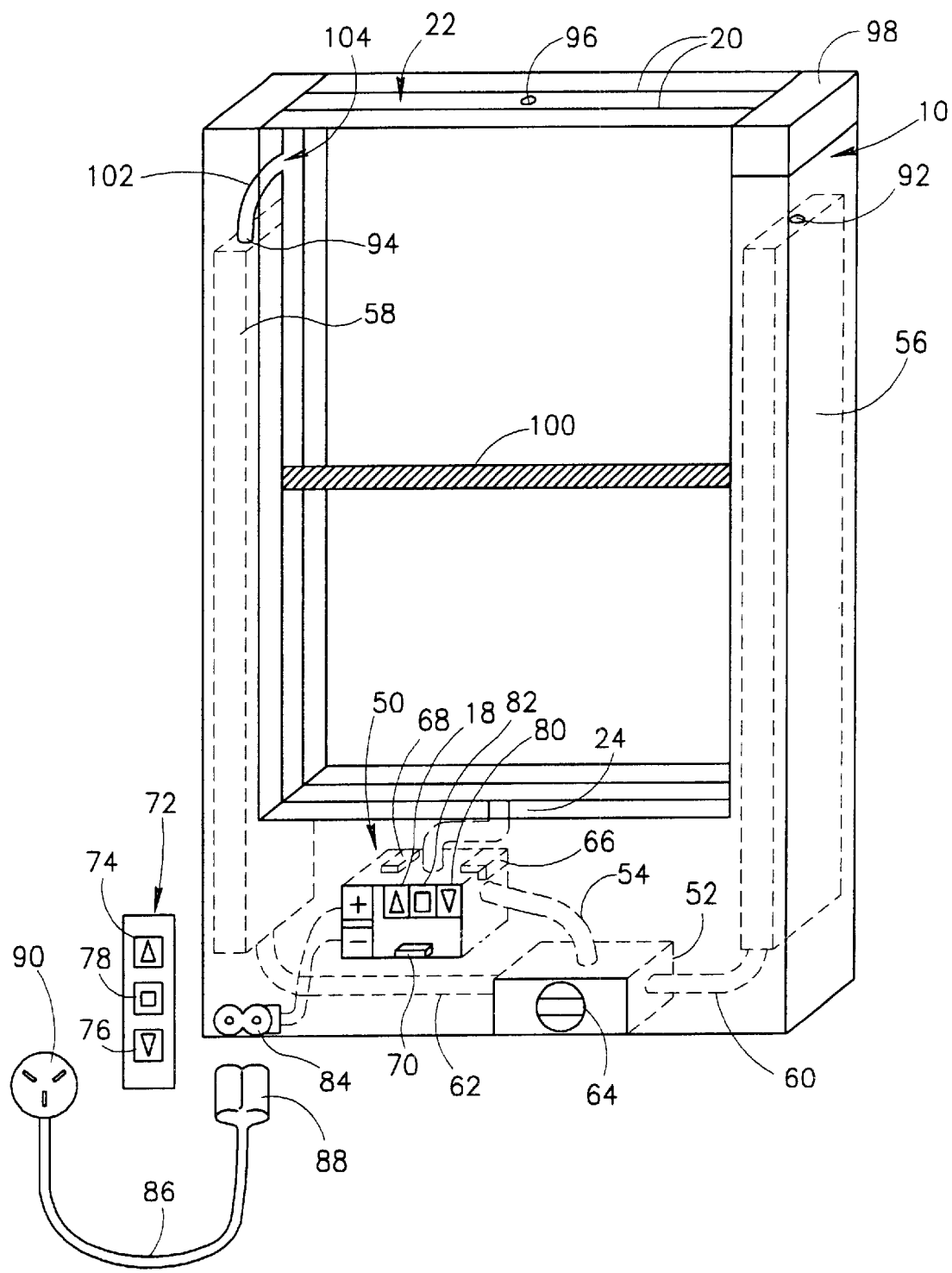
FIG. 2 shows a perspective cross sectional view of a second "closed system" ornamental panel according to the present invention.

FIG. 2 shows a perspective cross sectional view of a second "closed system" ornamental panel according to the present invention. The second ornamental panel is a mechanism, which is preferably situated at the bottom of window frame 10. This mechanism includes a control module 50, power source 16 and activator switch 18. Preferably, control module 50 is responsive to activator switch 18 being depressed.

As shown, window frame 10 also includes at least two transparent or translucent panels 20. Alternatively, semi-transparent, frosted or tinted panels can be used. Panels 20 are situated at a distance from each other, thereby creating a margin 22, which margin 22 is readily filled with gasses or fluids. Alternatively, air may be pumped out of margin 22 to create a vacuum, such that insulation properties and acoustic properties of the present invention can be enhanced.

Preferably, a first tube 24 is attached to margin 22, formed between panels 20, on one extremity of first tube 24. The other extremity of tube 24 is attached to control unit 50, thus readily facilitating control of flow liquid flow or gases through control module 50 to margin 22.

Preferably a valve module 52 is connected to control unit 50 via a second tube 54, such that valve module 52 controls flow from a first color cartridge 56 and a second cartridge 58. First color cartridge 56 is attached to valve module 52 via a third tube 60 and second cartridge 58 is attached to valve module 52 via a fourth tube 62. Preferably, valve module 52 controls the flow of color with a selector switch 64 situated on valve module 52. Preferably, selector 64 is responsive to commands from control module 50, such that selector 64 either facilitates color being transferred to and from first cartridge 56 into margin 22, formed between panels 20, or selector 64 facilitates color transfer between second cartridge 58 and margin 22 formed between panels 20.

Preferably, valve module 52 also controls the direction and flow of fluids and gases between first cartridge 56 and margin 22 as well as between second cartridge 58 and margin 22 formed between panels 20.

An actuator 66 is preferably attached to color module 50 for readily entering color agents from color module 50 to margin 22 and for removing color agents or air from margin 22 formed between panels 20. Preferably, color module 50 and valve module 52 are responsive to a processing and control unit 68.

Especially preferred, a remote control receiver 70 is attached to control unit 50 and receiver 70 is responsive to commands from a remote control transmitter 72, such that a user can remotely operate the device of the present invention.

Preferably, remote control transmitter 72 includes a "fill" switch 74, designated "↑", for controlling passage of color to margin 22 formed between panels 20. Preferably, remote control transmitter 72 includes an "empty" switch 76, designated "↓", for controlling passage of color to margin 22 formed between panels 20. Additionally and preferably, remote control transmitter 72 includes a "stop" switch 78, designated "☐", for stopping either the "fill" or "empty" action.

Clearly, remote control transmitter 72 can be constructed to remotely control the performance of any of the above features and functions.

As for the panel of FIG. 1, preferably the user is able to control a number of different characteristics of the panel. For example, optionally and preferably, the user can select a different color or a specific color mixture. Alternatively, pre-designated color combinations and timed color changes can be programmed in processing unit 68, thereby matching the external ambient light to the lighting requirements. As for the example of FIG. 1, by way of illustration only, a vehicle window can be tinted to create optimal visibility for drivers. Additionally, color changes according to the requirements of the user can be created.

Preferably, control module 50 includes a manual "empty" switch 80, for controlling passage of color to margin 22 formed between panels 20. Additionally and preferably, control module 50 includes a manual "stop" switch 82, designated "☐", for stopping either the "fill" or "empty" action.

Thus, complete manual operation of the device according to the present invention, is facilitated with and without remote control transmitter 72 and remote control receiver 70.

Preferably, power source 16 is a rechargeable battery power supply electrically connected to a recharge socket 84, similar to sockets found on home appliances and televisions. Preferably, a power cable 86 having a complementary plug 88 to socket 82 and a standard wall plug 90, thereby facilitating constant power supply and recharging of battery supply 16.

Preferably, first cartridge 56 includes a first "bleeding" valve 92 for enabling air to enter and leave first cartridge 56 upon a "fill" action and an "empty" action, thus balancing external and internal pressures in and around first cartridge 56.

Preferably, second cartridge 58 includes a second "bleeding" valve 94 for enabling air to enter and leave first cartridge 58 upon a "fill" action and an "empty" action, thus balancing external and internal pressures in and around first cartridge 58.

Also preferred, margin 22, formed between panels 20 is sealed air and water tight, save for a margin valve 96 for enabling air to enter and leave margin 22, formed between panels 20 upon a "fill" action and an "empty" action, thus balancing external and internal pressures in and around first margin 22.

Preferably, window 10 includes a light sensor 98 for measuring the quantity of ambient light on the external and internal sides of window 10. Preferably, control unit 50 is responsive to measurements and data received from sensor 98. Thus, according to the difference between light measured internally and externally, color changes can be pre-programmed to substantially create consistent and adequate lighting on the internal side of window 10. Such a feature would be highly advantageous when window 10 is a vehicle window.

Especially preferred, window 10 includes a wiper 100 for cleaning, removing and separating colors. Occasioning on a color agent being displaced into margin 22, pressure is created which raises wiper 100 substantially upwards. Occasioning on a color agent being removed from margin 22, a sub pressure or vacuum is created which substantially lowers wiper 100 while wiping the inner sides of panels 20, thereby preventing contamination and dilution of color agents. Upon a color agent being entered or removed from margin 22, a complementary displacement of wiper 100 occurs due to pressure buildup. To this end, margin valve 96 facilitates air-flow to balance the pressure created substantially above wiper 100.

Alternatively, second cartridge 58 includes a connector 102 for transferring color agents from second cartridge 58 to margin 22, responsively to control unit 50. Connector 102 facilitates passage of color agents to the upper part of window 10 via an upper aperture 104 into margin 22. Thus, substantially contemporaneous transfer of a color agent from second cartridge 58 to margin 22 is facilitated at the same time as transferring a different color agent from margin 22 back into first cartridge 56 and vice versa.

Alternatively a plurality of panels 20 can be used to create several margins 22 substantially behind each other and thereby enhance visual effects even further (not shown in FIG. 2). By way of example only, blue color could be entered to one margin 22 and red color could be entered into a second margin 22. The areas having colors super-imposed would create a substantially purple coloring, thereby enhancing visual effects of window 10 (not shown in FIG. 2).

Figure 3A:
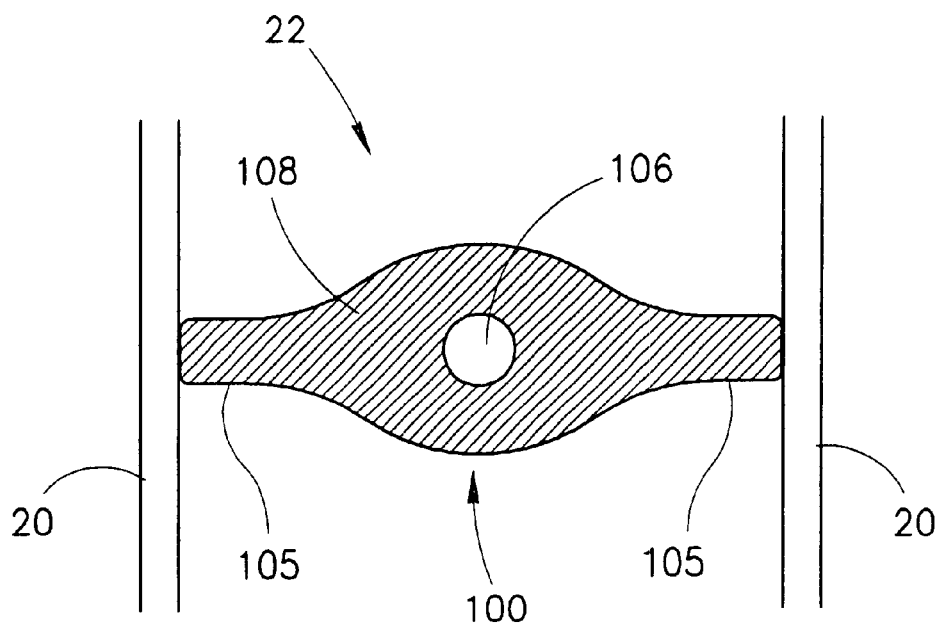
FIGS. 3A–3B show preferred stabilization elements for a wiper used in the embodiment shown in FIG. 2.

FIG. 3 shows preferred stabilization elements for a wiper 100. As shown in FIG. 3A which is a side view cross section of the area including wiper 100 of FIG. 2, at least two transparent or translucent panels 20 which by way of example only are transparent, semi-transparent, frosted or tinted, create a margin 22. Preferably, as described in FIG. 2 hereinabove, margin 22 includes a wiper 100 for cleaning, removing and separating colors. Preferably, the cross section of wiper 100 is substantially as shown in FIG. 3A. Thus, upon displacing wiper 100 a pair of "wings" 105 become arched, thereby sealing margin 22 and removing any color agents and residues.

Upon displacing wiper 100 in an opposite direction, wings 105 are arched again, thereby sealing margin 22 and removing any color agents and residues.

Preferably, wiper 100 includes a stabilizing rod 106 for stabilizing wiper 100 and preventing wiper 100 from becoming displaced out of alignment. Preferably rod 106 protrudes from wiper 100 and can be used for internal rail mounting (not shown in FIG. 3A).

Preferably, wiper 100 includes a substantially flat side 108, such that the chance of wiper 100 being displaced out of alignment is significantly reduced.

Figure 3B:
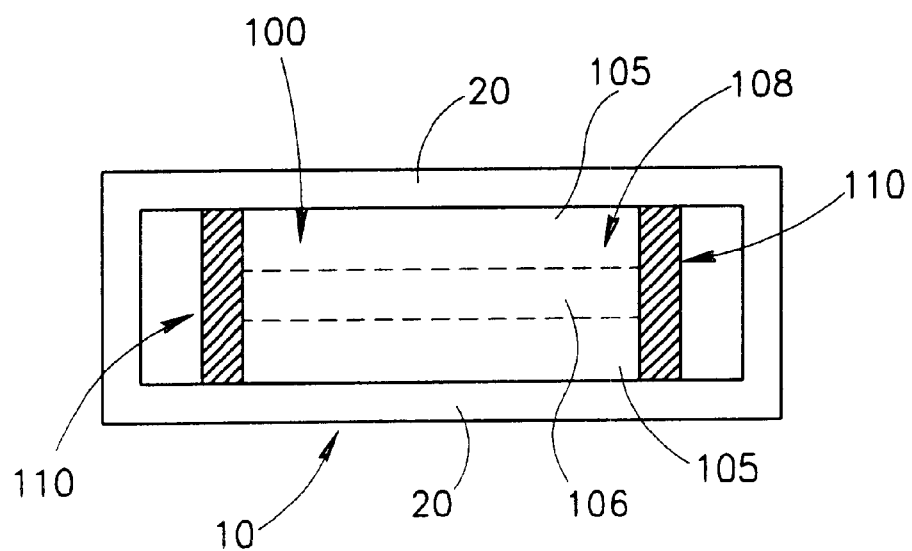

As shown in FIG. 3B, which is a top view cross section of the area including wiper 100 of FIG. 2, at least two transparent or translucent panels 20 create a margin 22 in a window 10. Margin 22 includes a wiper 100 for cleaning, removing and separating colors. Preferably, the cross section of wiper 100 is substantially as shown in FIG. 3A and wiper 100 includes at least two wings 105 as shown in FIG. 3B and a stabilizing rod 106 for stabilizing wiper and preventing wiper 100 from becoming displaced out of alignment.

Preferably, wiper 100 includes a substantially flat side 108, such that the chance of wiper 100 being displaced out of alignment is significantly reduced. More preferably, each flat side 108 includes a stabilizing shoe 110 for further preventing wiper 100 from becoming displaced out of alignment.

Figure 4:
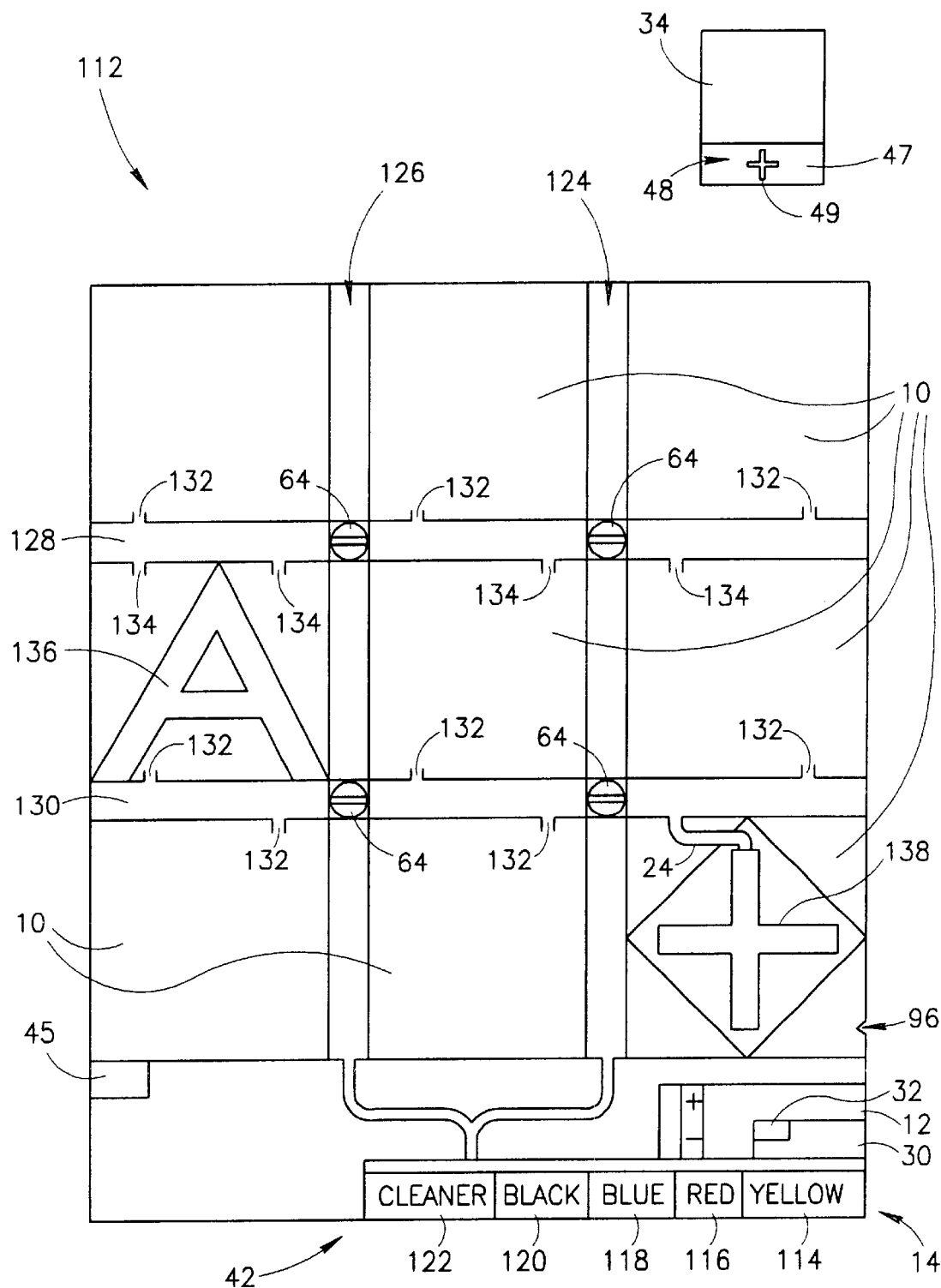
FIG. 4 shows a novel matrix system of windows according to the present invention.

FIG. 4 shows a novel matrix system using a plurality of windows and valves to control the flow to and from the margins. Such a matrix is highly advantageous when creating advertising space or large billboards. A further use of such a matrix is in creating large display apparatus, which can emulate the display of a television or computer screen. Thus, a large sign can be placed in a town center producing a large graphic image with a resolution equaling or exceeding those found in television and computer displays.

FIG. 4 is a frontal view of a matrix 112 comprised of window frames similar to the windows 10 described hereinabove. Like above, each window frame 10 also includes at least two transparent or translucent panels, which can be semi-transparent, frosted or tinted (not shown in FIG. 4). Similarly to the embodiments described hereinabove, in each window 10, the panels are situated at a distance from each other, thereby creating a margin which is readily filled with gasses or fluids (not shown in FIG. 4).

A control module 12 for controlling the operations of and color flow into each window 10 is provided. Control module 12 preferably includes a power source 16 and an actuator 28 to color control module 12 for readily entering color agents from a plurality of color cartridges 42.

Preferably, a control valve 26 is responsive to a processing and control unit 30. Especially preferred, a remote control receiver 32 is attached to processing and control unit 30 and receiver 32 is responsive to commands from a remote control transmitter 34, such that a user can remotely operate the device of the present invention.

Preferably, color agent cartridges 42 are included in a color module 14, such that a user can select a different color or a specific color mixture, according to the choice of the user. Alternatively, pre-designated color combinations and timed color changes can be programmed in processing and control unit 30, thereby matching the external ambient light to the lighting requirements.

Preferably color module 14 includes yellow cartridge 114, a red cartridge 116 a blue cartridge 118, forming the three base colors and facilitating substantially any color of the visible spectrum. Preferable a black cartridge 120 is included in color module 14 for creating shading or blackening any window 10. Preferably, color module 14 also includes a cleaner module 122 for cleaning any window 10.

Like above, complete manual operation of the device according to the present invention, is facilitated with and without remote control transmitter 34 and remote control receiver 32.

Preferably, each cartridge 42 contains a toner, pigment, concentrate of color and the like. Additionally and preferably, a first pipe 36 is connected to color module 14 and a second pipe 46 is also connected to color module 14.

For increased control on color combinations, remote control 34 preferably includes a "rainbow" control 47. Preferably, a rainbow colored panel 48 visibly indicates the visible light spectrum, such that a user can displace a control switch 49, thereby setting "rainbow" control to a specific wavelength of visible light. Preferably, processing and control unit 30 is responsive to "rainbow" control 47 settings, such that cartridges 42 create substantially the same color combination as indicated by control switch 49 and panel 48.

Optionally, a light sensor 45 for measuring the quantity of ambient light on the external and internal sides of matrix 112 is included. Preferably, processing and control unit 30 is responsive to measurements and data received from sensor 45. Thus, according to the difference between light measured internally and externally, color changes can be pre-programmed to substantially create consistent and adequate lighting on the internal side of the matrix 112.

Preferably first pipe 36 is attached to a first vertical channel 124 and second pipe 46 is attached to a second vertical channel 126.

A first horizontal channel 128 is transversely connected to first vertical channel 124 and second vertical channel 126.

A second horizontal channel 130 is transversely connected to first vertical channel 124 and second vertical channel 126.

Thus, each window 10 is in contact with at least two channels from first vertical channel 124, second vertical channel 126, first horizontal channel 128 and second horizontal channel 130. In each substantially crosswise connection between vertical channels 124, 126 and horizontal channels 128, 130 a selector switch 64 is situated. Preferably, selector 64 is responsive to commands from control module 12, such that selector 64 either facilitates color being transferred to and from each window 10 through a plurality of valves 132. Preferably, flow of color agents to and from windows 10 is responsive to control module 10.

Alternatively, valves 132 are unidirectional and facilitate only filling windows 10. A plurality of emptying valves 134 are provided for "bleeding" air from each window 10 or emptying the content of window 10, according to user preference.

Preferably, color module 14, selectors 64 and valves 132, and emptying valves 134 are responsive to a processing and control unit 32 included in control module 12.

Preferably, power source 16 is a rechargeable battery power supply electrically connected to a recharge socket, similar to sockets found on home appliances and televisions (not shown in FIG. 4).

Alternatively, each window 10 can include pre shaped panels of any geometric shape. As shown in FIG. 4, a triangular panel 136 facilitates creating a unique geometric shape for window 10. Preferably and as shown in FIG. 4, triangular panel 136 can be shaped to form the letter "A", thereby facilitating creating signage with alphanumeric characters.

Additionally, a substantially rectangular panel 138 is connected to second horizontal channel 130 via a tube 24. Thus, tube 24 readily facilitates flow of liquid or gaseous coloring agents from rectangular panel 138 to second horizontal channel 130 and back. Preferably and as shown in FIG. 4, rectangular panel 138 can be shaped to form the sign of a cross in a diamond shape, thereby facilitating creating signage with specific characters. More preferably, the displayed sign which is formed in rectangular panel 138 can be filled, via tube 24, with a red color, thereby indicating a symbol generally recognized with medical assistance. Thus, windows can be created which are substantially transparent and ornamental during normal usage and create and emergency call for assistance in cases where such assistance is required.

Also preferred, the margin 22 formed between the panels is sealed air and water tight, save for a margin valve 96 for enabling air to enter and leave the margin, formed between the panels upon a "fill" action and an "empty" action, thus balancing external and internal pressures in and around the margin (panels and margins not shown in FIG. 4).

Preferably matrix 112, can be of varying sizes and used as signs, bill-boards and media carriers.

Other optional and preferred embodiments of the present invention include the use of semi resilient of pliable transparent materials, such that the panels can be attached to an existing window or windscreen of an automobile.

Another preferred embodiment of the present invention is for adding a single panel to an existing window thereby creating a margin between the panel and existing window. Thus, specialized shading is envisaged for a motor vehicle which can be adjusted to create, throughout most of the day, a substantially constant quantity of light flowing through the window and reaching the eyes of a driver.

It will be appreciated that the above descriptions are intended only to serve as examples, and that many other embodiments are possible within the spirit and the scope of the present invention.

What is claimed is:

1. An ornamental window, comprising:
   (a) a first panel;
   (b) a second panel situated at a distance from said first panel, thereby forming a readily fillable margin between said first panel and said second panel;
   (c) a plurality of agent cartridges for providing material for completely filling said readily fillable margin, each agent cartridge including material of a different color, said material determining an amount of light passed according to an opacity of said material; and
   (d) a wiper for removing material of a first color when material of a second color is to fill said readily fillable margin, said wiper comprising a pair of wings for sealing said readily fillable margin and for removing said material of said first color.

2. The ornamental window of claim 1, wherein said window is a billboard.

3. The ornamental window of claim 1, wherein said window is a large display.

4. The ornamental window of claim 4, wherein said first panel is pre-colored with a color.

5. The ornamental window of claim 4, wherein said color of said first panel is selected from the group of tinted, frosted, colored and semi transparent.

6. An ornamental system comprising a matrix of ornamental windows, wherein each window includes:
   (a) a first panel;
   (b) a second panel situated at a distance from said first panel, thereby forming a readily fillable margin of a predetermined alphanumeric shape between said first panel and said second panel and wherein said margin is readily fillable with a non-inert gas;
   (c) a color module including a plurality of cartridges, for controlling color of the content in said margin formed between said first panel and said second panel;
   (d) a control module for controlling said color module;

(e) a power source for powering said control module and said color module;

(f) a processing and control unit electronically attached to said control module, including a remote control receiver for receiving remote commands;

(g) a remote control transmitter including:
  (i) an activator switch;
  (ii) a deactivator switch; and
  (iii) a rainbow control for controlling color of content in said margin formed between said first panel and said second panel;

(h) a light sensor electronically connected to said control module, wherein said control module is responsive to light measurements of said light sensor;

(i) a plurality of valves, responsive to commands from said control module, for controlling content of each of said windows.

7. The ornamental window of claim 6, wherein said first panel is pre-colored with a color.

8. The ornamental window of claim 7, wherein said color of said first panel is selected from the group of tinted, frosted, colored and semi transparent.

9. The ornamental window of claim 6, wherein said window is a billboard.

10. The ornamental window of claim 6, wherein said window is a large display.

* * * * *